J. Thomas,
Felting Machine.
No. 15,261.  Patented July 1, 1856.
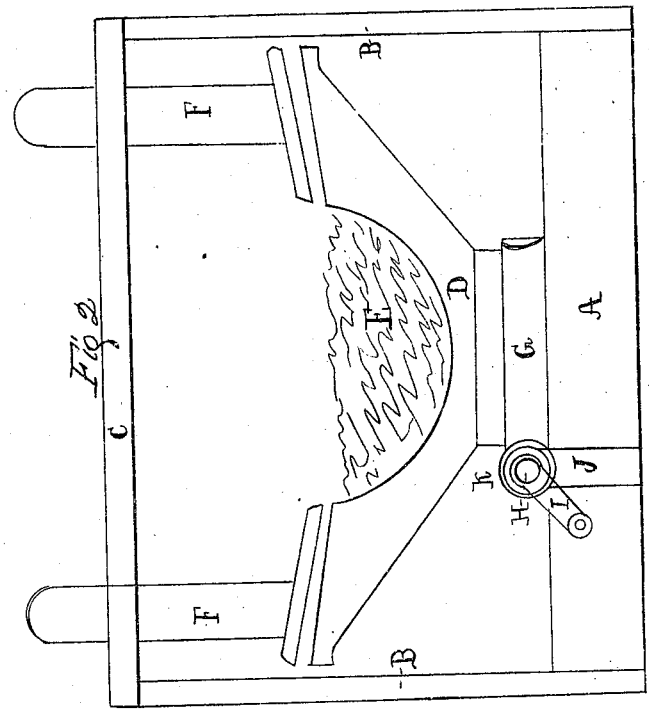
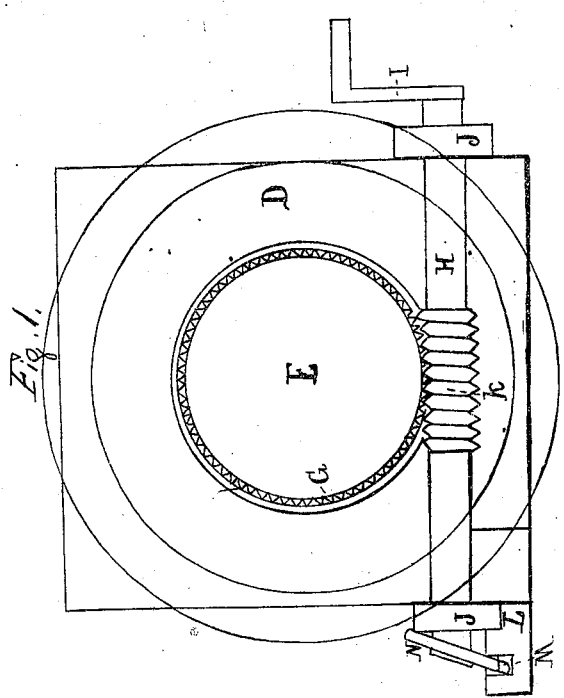

UNITED STATES PATENT OFFICE.

JOSEPH THOMAS, OF BROOKLYN, NEW YORK.

MACHINERY FOR FELTING HAT-BODIES.

Specification of Letters Patent No. 15,261, dated July 1, 1856.

*To all whom it may concern:*

Be it known that I, JOSEPH THOMAS, of Brooklyn, in the county of Kings and State of New York, have invented a new and Improved Machine for Sizing and Felting Hat-Bodies; and I do hereby declare the following to be a full description thereof, reference being had to the accompanying drawings, figures, and letters of reference thereon, in which—

Figure 1 is a top view of my machine with the cross bar C, and felting surface of the hopper wheel removed in order to show the screw and gear for working the machine. Fig. 2 is a side elevation of it.

Nearly all the machines for this purpose heretofore have been of difficult and complex construction, and their partial introduction has met with many objections upon the ground of economy. My object has been to overcome these objections, and produce a machine simple in construction and operation—practical in its results and lastly a labor saving machine.

To this end and to enable others skilled in the art to make and use my invention I will describe the same.

A, is the base of the machine.

B, B, are standards which support the cross piece C, on top.

D, is the hopper or reservoir wheel, (similar in form to the common wash basin).

E, is the reservoir of water.

F, F, are two segments which press upon the goods.

G is a gear inclosing the lower part of the hopper and made fast thereon to work the hopper.

H is a shaft having thereon a worm screw K, Fig. 1.

I is the crank or winch to work the machine.

J, J, are short standards which support the shaft H, and allow the vibrating motion.

Operation: Motion being given the crank shaft H, will cause the screw to work the hopper by means of the gear which is fast thereon; while the cam N, working in the grooved piece at M, will cause the screw shaft to have a vibratory motion and also an advancing motion to feed the goods and felt or size them, by the conjoint action of the hopper surface and the segments. The goods can be dipped readily in the reservoir of water E, and then placed upon the hopper surface to pass under the segments, which may be weighted down by any suitable device in order to render the pressure desired to felt or size the goods.

Having thus described my improved machine what I claim as new therein and desire to secure by Letters Patent is—

I claim giving the vibrating motion to the reservoir wheel, by the combined action of the screw, and cam (or any equivalent device) when arranged and operating essentially as described, and for the purpose set forth.

JOSEPH THOMAS. [L. S.]

Witnesses:
C. A. DURGIN,
JOHN S. HOLLINGSHEAD.